Aug. 15, 1950  F. J. SCHMIDT  2,519,075
DRIVE MECHANISM FOR TRENCH DIGGING MACHINES
Filed June 20, 1947  7 Sheets-Sheet 1
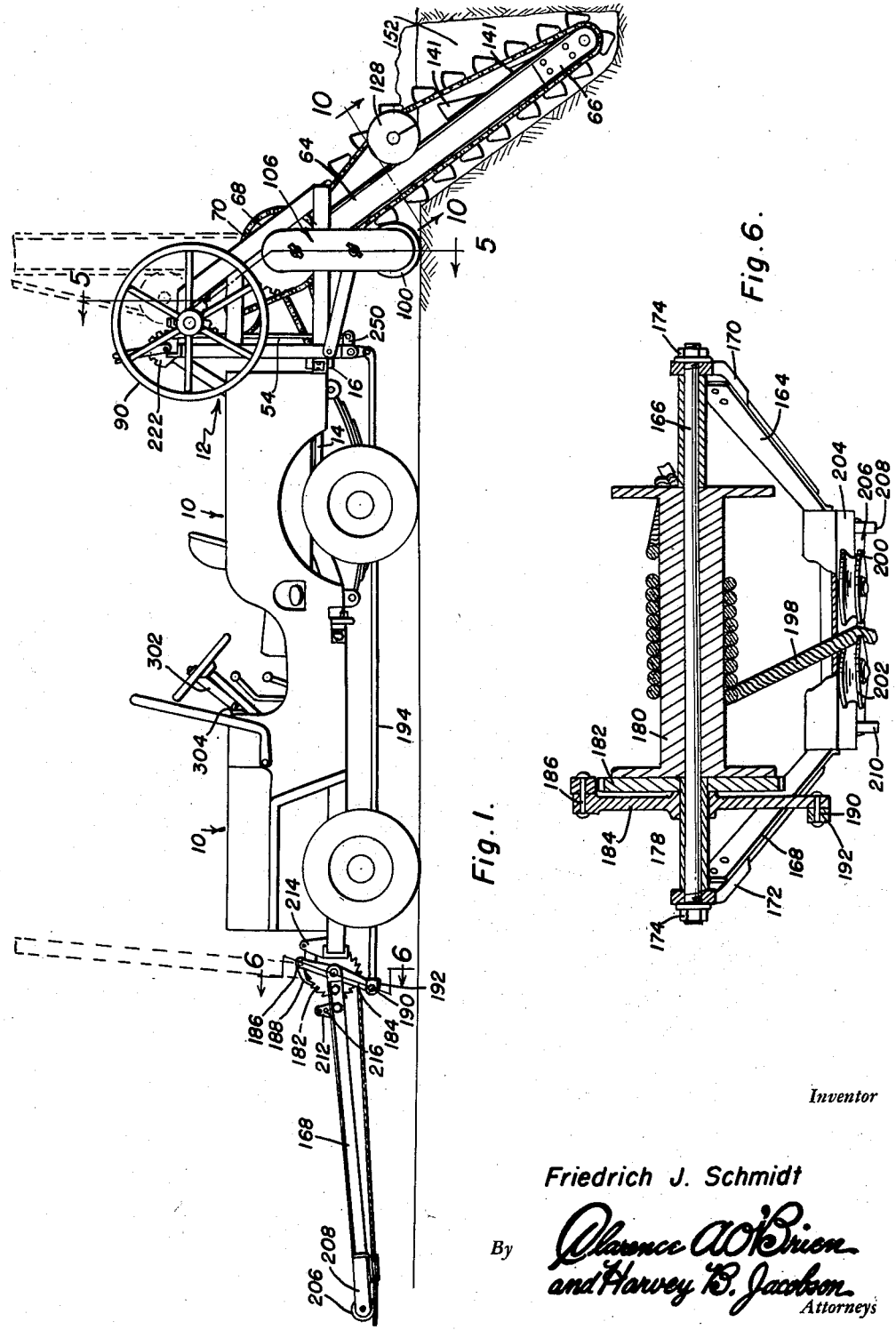
Inventor
Friedrich J. Schmidt
By Clarence A. O'Brien
and Harvey B. Jackson
Attorneys Aug. 15, 1950  F. J. SCHMIDT  2,519,075
DRIVE MECHANISM FOR TRENCH DIGGING MACHINES
Filed June 20, 1947  7 Sheets-Sheet 2
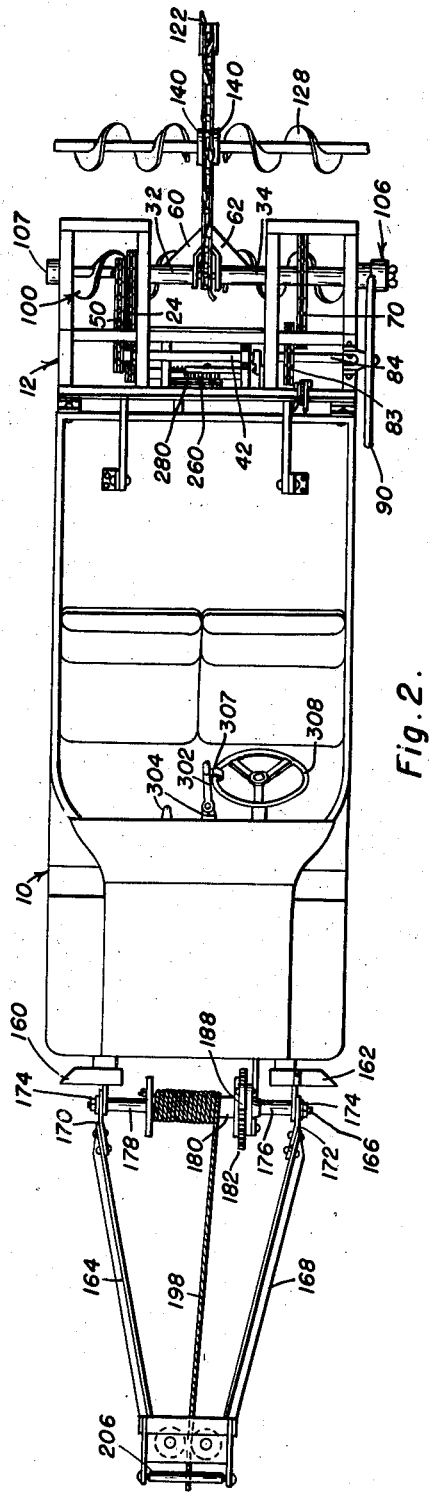
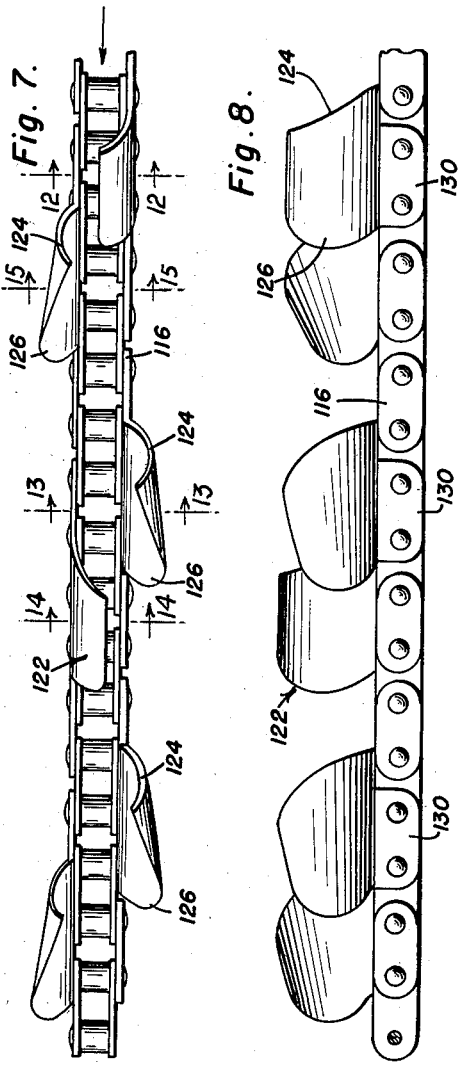
Inventor
Friedrich J. Schmidt
By Clarence A. O'Brien
and Harvey B. Jacobson
Attorneys Aug. 15, 1950      F. J. SCHMIDT      2,519,075
DRIVE MECHANISM FOR TRENCH DIGGING MACHINES
Filed June 20, 1947      7 Sheets-Sheet 3

Inventor

Friedrich J. Schmidt

By *Clarence A. O'Brien and Harvey B. Jacobson*
Attorneys

Aug. 15, 1950     F. J. SCHMIDT     2,519,075
DRIVE MECHANISM FOR TRENCH DIGGING MACHINES
Filed June 20, 1947     7 Sheets-Sheet 4
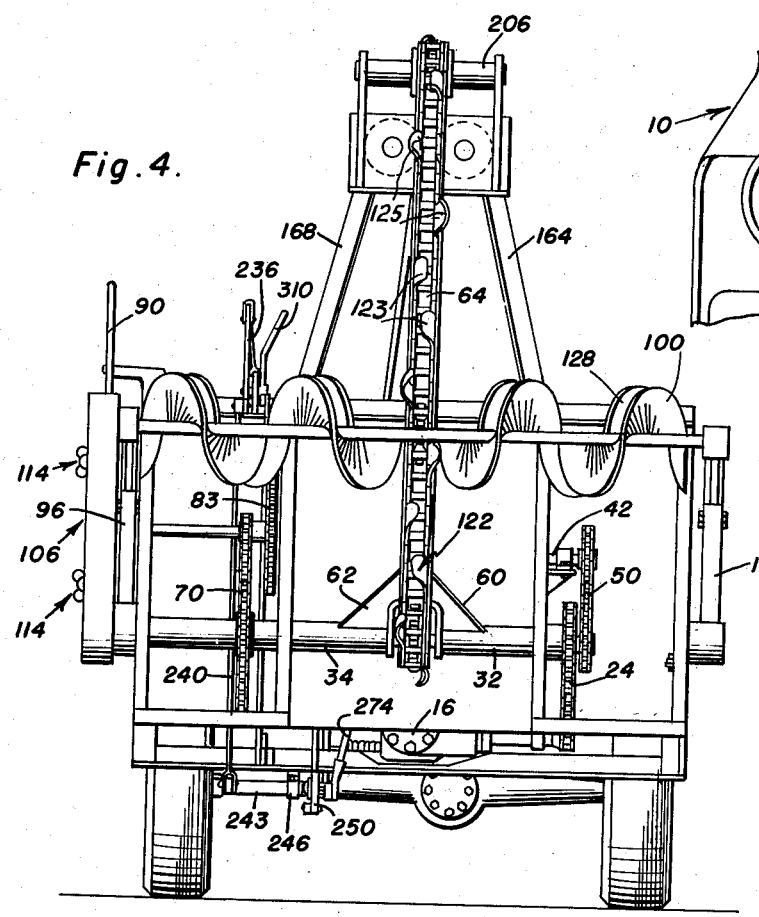
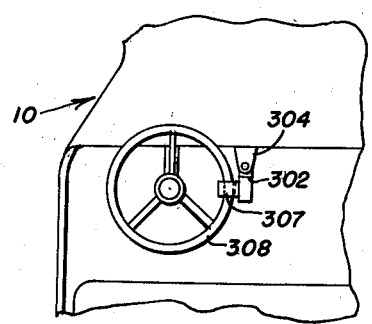
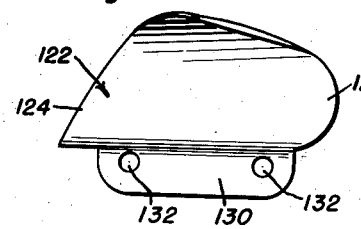
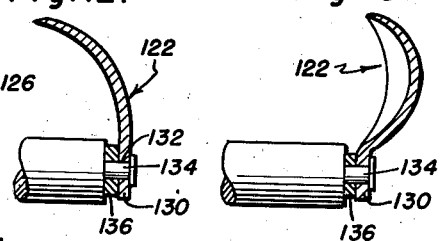
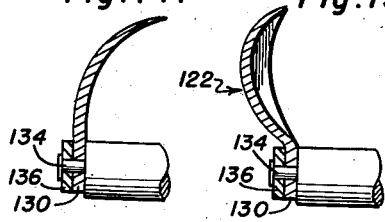
Inventor
Friedrich J. Schmidt
By *Clarence A. O'Brien and Harvey B. Jacobson*
Attorneys Aug. 15, 1950 F. J. SCHMIDT 2,519,075
DRIVE MECHANISM FOR TRENCH DIGGING MACHINES
Filed June 20, 1947 7 Sheets-Sheet 5
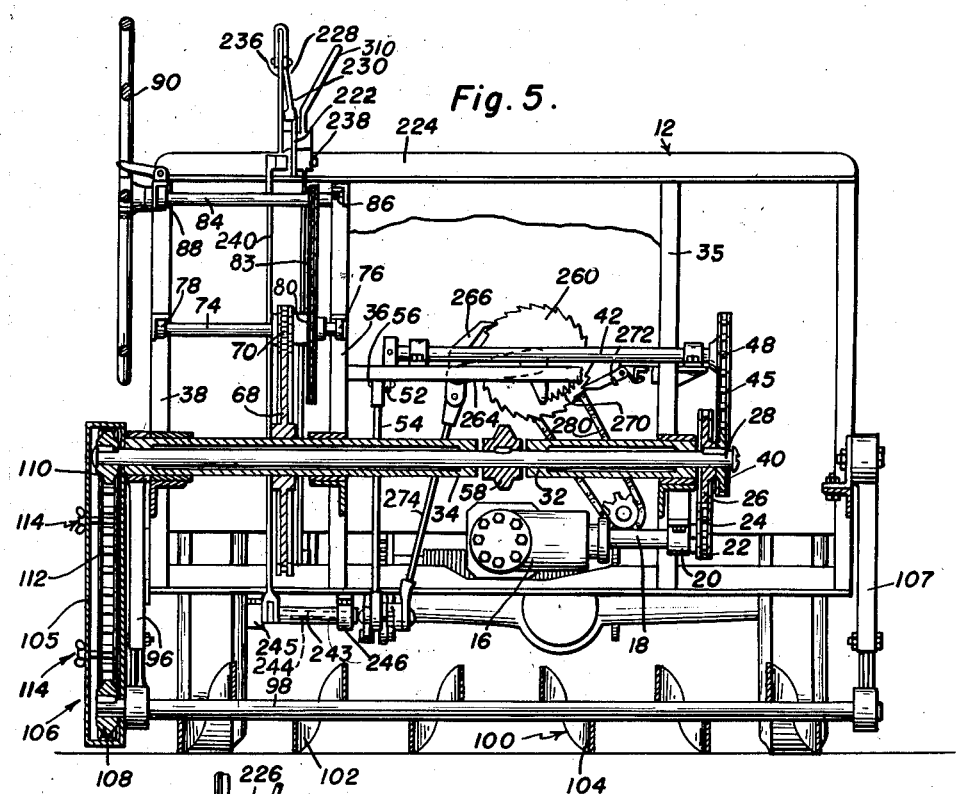
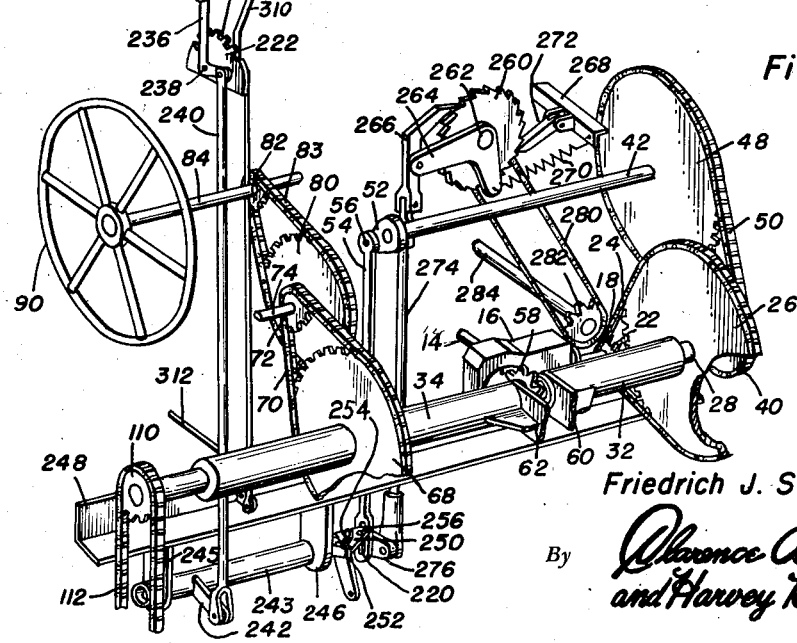
Inventor
Friedrich J. Schmidt

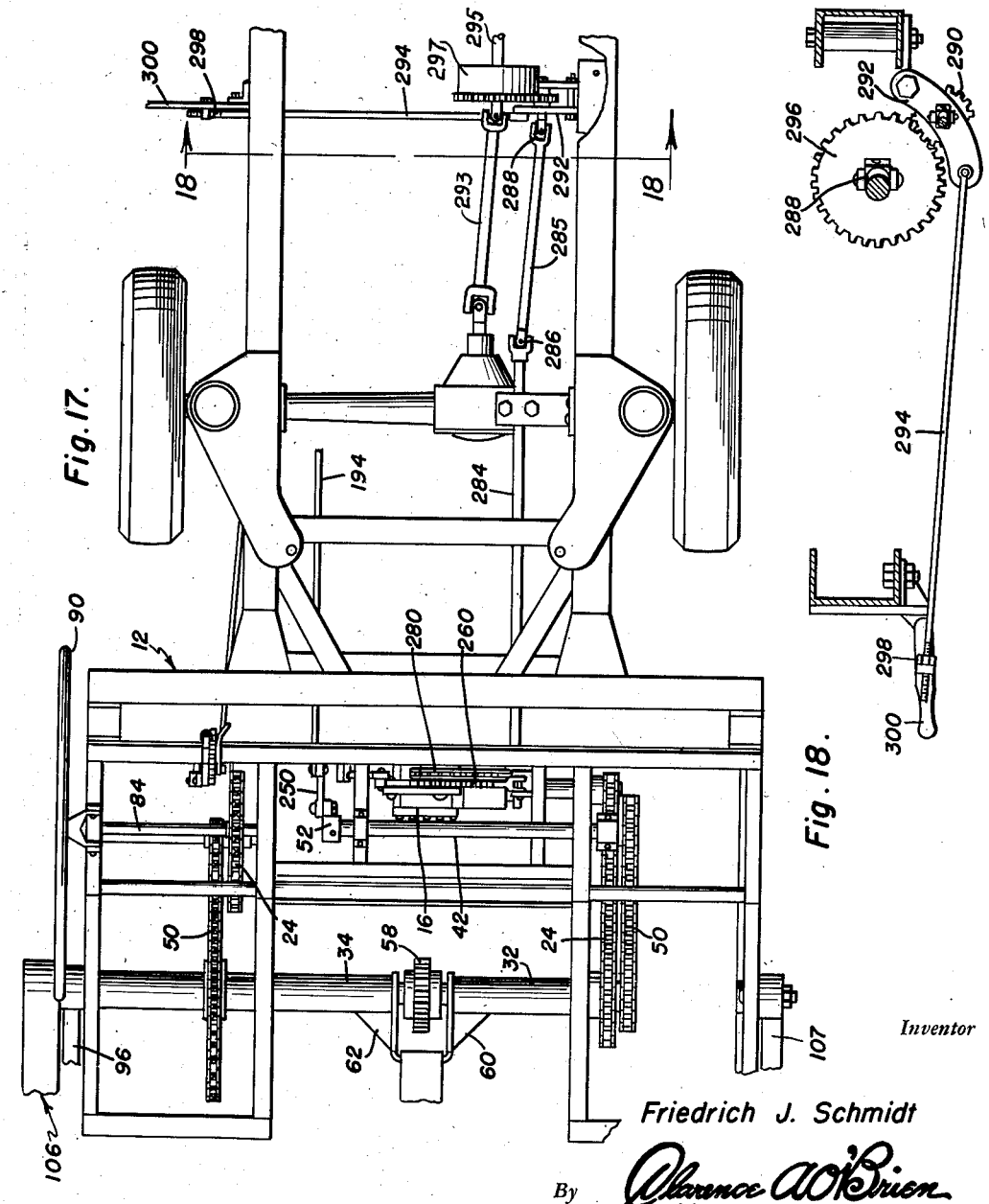

Aug. 15, 1950     F. J. SCHMIDT     2,519,075
DRIVE MECHANISM FOR TRENCH DIGGING MACHINES
Filed June 20, 1947     7 Sheets-Sheet 7

INVENTOR.
Friedrich J. Schmidt
BY
Carlson, Pitzner, Hubbard & Wolfe
Atty.

Patented Aug. 15, 1950

2,519,075

UNITED STATES PATENT OFFICE 2,519,075

DRIVE MECHANISM FOR TRENCH DIGGING MACHINES

Friedrich J. Schmidt, Auburn, Nebr., assignor to Auburn Machine Works, Inc., Auburn, Nebr., a corporation of Nebraska Application June 20, 1947, Serial No. 755,825

4 Claims. (Cl. 37—86)

This invention appertains to novel and useful improvements in devices for digging trenches and the like.

An object of this invention is to provide means for digging trenches particularly suitable for mounting on a conventional vehicle such as a truck or "jeep" without any substantial modification thereof and driven from the vehicle power take-off. It is a related object to provide novel means coordinated with the digger portion of the device for enabling the vehicle to be advanced positively at a speed which is only a fraction of the normally obtainable minimum speed and with the engine operating at full rated R. P. M. In one of its aspects it is an object of the invention to provide means for advancement of the vehicle intermittently but at regularly recurring intervals by novel mechanism capable of acting separately or simultaneously on a winch and on the vehicle driving wheels.

Also, a purpose of this invention is to provide improved means for driving the vehicle at a selected speed in accordance with the rate of cutting.

Further objects and features of novelty, including numerous ancillary purposes of the present invention will become apparent to those skilled in the art, in following the description of the preferred embodiment of the present invention, illustrated in the accompanying drawings, wherein:

Figure 1 is an elevational side view of the preferred form of trencher constructed in accordance with the present invention;

Figure 2 is a plan view of the invention disclosed in Figure 1;

Figure 4 is an elevational rear view of the invention disclosed in Figure 3 showing certain elements in a raised position;

Figure 5 is a transverse sectional view of the invention disclosed in Figure 1 and taken substantially on the line 5—5 thereof and in the direction of the arrows;

Figure 6 is a transverse sectional view of the invention disclosed in Figure 1 and taken substantially on the line 6—6 thereof and in the direction of the arrows;

Figure 7 is an enlarged elevational plan view of the digging means forming part of the present invention;

Figure 8 is an elevational side view of the detail of construction shown in Figure 7;

Figure 11 is an elevational side view of a blade cutting element forming an important part of the present invention;

Figures 12, 13, 14 and 15 are transverse sectional views taken on Figure 7 and showing details of construction of the cutter means and each taken on lines 12—12, 13—13, 14—14 and 15—15, respectively; and Figure 16 is a perspective view illustrating certain control and drive elements forming part of the present invention;

Figure 17 is a fragmentary plan view of a portion of the invention· parts removed to illustrate details of construction;

Figure 18 is a transverse sectional view of the detail in Figure 17 and taken on the line 18—18 thereof; and Figure 19 is an elevational view of a portion of the invention showing primarily lock means for the vehicle steering wheel.

Figure 20:
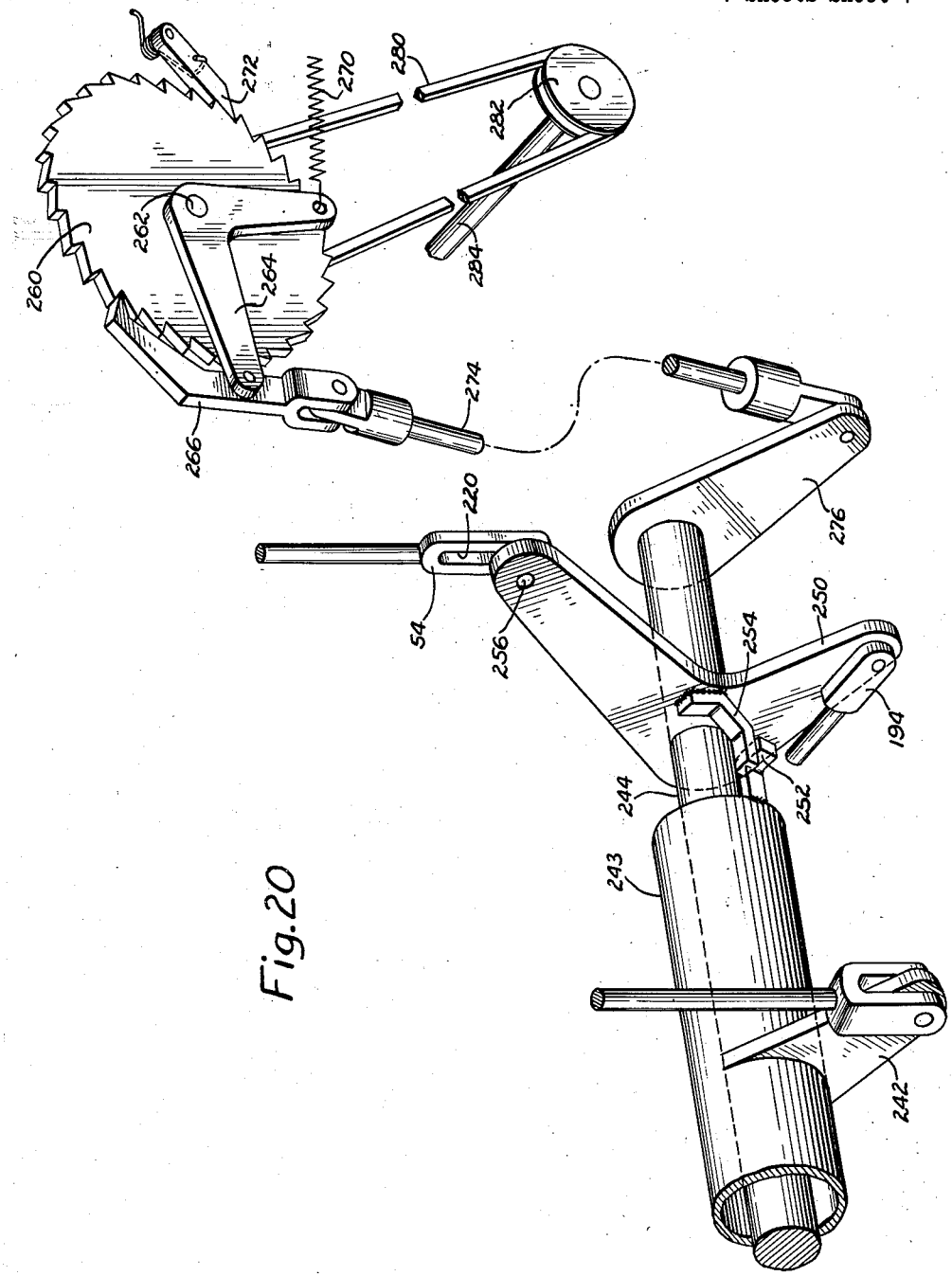

Figure 20 shows the construction of the ratchet stroke adjusting mechanism.

Referring now in detail to the illustrated, preferred embodiment of the present invention, like reference characters are used throughout to illustrate similar elements. This invention has been conceived and developed to provide a device to fulfill the tremendous need and demand for a trench digging machine which would be not only much smaller and more portable than the large, very heavy conventional trench digging devices now known in the art but which could be sold at a fraction of the cost.

The illustrated, preferred embodiment of the present invention is most advantageously applied where needed, such as in environments wherein a trench of given cross section must be dug in a minimum of time and yet have smooth, accurately formed side walls. The present invention also fills the need and demand for a device of this nature embodying great flexibility, portability and roadability. The machine is flexible in that the trenching mechanism is mounted on the power unit vehicle and does its intended operation and work while mounted thereon. If desired, the mechanism can be removed, allowing the power unit to function in some other capacity.

The machine is highly portable, as it can be quickly engaged in or disengaged from its digging position, and can be moved from one job or "set" to another simply by raising the boom and cable to a vertical position. This renders the machine roadable and the entire unit may travel to the next job at high speed without regard for the digging mechanism.

The present construction is eminently suited for power digging of trenches for utility feeder lines as required for gas or water or for underground electric systems. Such trenches, heretofore, were dug by hand with a spade, as it has been impossible or impractical to use the large, heavy trenching machines of conventional type in approaching terraces, grass-seeded lawns, concrete sidewalks, and other places which cannot very well be disturbed, injured or destroyed.

For small service lines, in view of the narrower trench dug by this machine, the amount of material removed is held to a minimum, resulting in a corresponding lesser amount of required backfill and tamping after installation of the line is completed. This is an important feature of the present invention, as it obviously reduces the amount of manual labor involved in the operation. The present construction is also well suited for the digging of accurately formed trenches into which concrete may be poured directly for constructing building foundations thereby eliminating the use of forms and the set-up work generally required.

In completing the design of the present machine, a new cutting and elevating principle, which completely eliminates buckets and spades, has been conceived. It has been found that by curving and sharpening a series of steel cutting blades in the manner to be presently disclosed and mounting them for edgewise movement on an endless, roller-conveyor type chain, the blades not only cut the ground but also elevate the fill to the surface, completely eliminating scoops, pocketed blades, buckets and the like. The general shape of the blades and their placement on the endless roller chain are illustrated in the accompanying drawings which show the cutter blades and endless roller chain in detail. As an additional feature the cutter blade is so designed that the heel thereof, which is the thicker side of the said blade opposite the cutting edge, rests on the chain link immediately adjacent. This provides a bearing surface for the said blade in addition to its actual mounting on the chain.

There is provided means for leveling the surface prior to actually digging a trench and also means for piling the dirt which has been elevated from the trench into neat ridges spaced at a uniform distance. Obviously, workmen can operate far more conveniently, and therefore more rapidly by reason of the completely cleared strip on each side of the trench. Also, the forward travel of the entire unit is produced in a novel and improved manner. In the embodiment disclosed a winch arrangement is applied to the forward end of the vehicle and the power derived from the prime mover within the said vehicle through the power take-off is utilized in a novel manner to operate the winch and to turn the vehicle drive shaft positively and at a slow rate of speed. In using the winch a suitable cable is connected thereto and anchored to some relatively immovable object. Of course, as the winch is operated, the cable is played in, thereby pulling the vehicle forward. When utilizing the drive shaft to propel the vehicle, the conventional gear shift mechanism is placed in a neutral position and torque is transmitted thereto through the same power take-off which is associated with the above-mentioned winch. In the present arrangement either drive may be used alone or they may be coordinated in a novel manner to insure positive forward movement of the vehicle even under the most adverse traction conditions.

A small, conventional vehicle 10, immediately recognizable as a conventional "jeep" from an inspection of Figure 1, is utilized in the present invention. Broadly, two assemblies are provided, the main assembly on the rear portion of the said vehicle 10, and the other on the forward portion thereof, the assemblies being both mechanically and functionally integrated with one another. A frame or support is provided on the rear portion of the said vehicle 10 and is generally indicated by the reference numeral 12. As is obvious from an inspection of the drawings, a plurality of arms and support members are provided in the frame which also serve the purpose of suitable journaling points for the elements to be described hereinafter. A power take-off shaft 14 extends from the transmission rearwardly into a power take-off gear box 16 conventionally known as a belt pulley drive. (See Figures 1 and 16.) A shaft 18 extends from said gear box 16 and is journaled in suitable split bearings 20, which form a portion of the said frame 12. A sprocket wheel 22 is rigidly secured to the said shaft 18 and a chain drive means 24 is operatively engaged therearound. The said chain drive means 24 also extends around a relatively larger sprocket wheel 26 which is fixedly secured to a shaft 28. The said shaft 28 is telescoped within sleeves 32 and 34 which are rigidly connected together and journaled in suitable bearings seated in apertures provided in frame members 35, 36, and 38, respectively.

Upon actuation of the prime mover within the vehicle 10 (the transmission in the appropriate gear), torque is transmitted through the shaft 18 and sprocket wheel 22 to the shaft 28, through the medium of chain means 24 and sprocket wheel 26. For further reduction another relatively small sprocket wheel 40 is fixedly secured to the said shaft 28 and serves to drive a larger sprocket wheel 48 on a shaft 42, a sprocket chain 50 being employed in this transmission. A crank or eccentric 52 is rigidly secured to the shaft 42 and a pitman, or connecting rod 54 is pivoted thereto for reciprocating movement. Any suitable, conventional pivot pin means 56 may be employed in retaining the said rod 54 in operative engagement with the eccentric 52.

As set forth broadly in the preceding description, means are provided for driving the cutter mechanism at a rate synchronized with the movement of the vehicle 10. The reciprocating rod 54 is utilized for effecting a coordinated forward movement of the vehicle and will be referred to in detail as the description proceeds. Thus attention may next be given to the digging mechanism itself.

Figure 9:
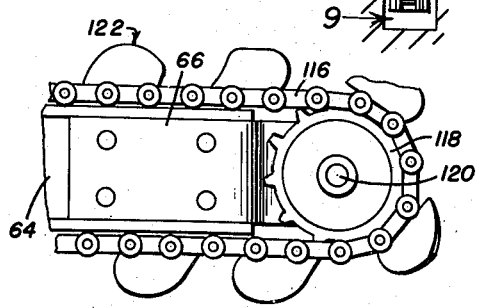
Figure 9 is a side elevational view of a detail of construction taken substantially on the line 9—9 of Figure 3 and in the direction of the arrows, portions being broken away to illustrate details of construction.

For the purpose of rotating the digging portion of the device, a drive sprocket wheel 58 is rigidly secured to the shaft 28 and occupies the axial space between the sleeves 32 and 34. Such space is bridged by suitable brackets 60 and 62 which are secured to the opposed ends of the sleeves 32 and 34 and extend rearwardly for the mounting of a beam 64 thereon. The beam and opposed sleeves thus constitute a rigid T-shaped unit enabling the beam to be swung so that it extends rearwardly and downwardly from the vehicle. Reference is made now to Figures 1 and 9, particularly, wherein the structure at the lower end of the beam is set forth in detail. Here it will be noted that the beam includes an extension 66 having a plurality of apertures therein. Complemental apertures are provided in the beam 64 for the reception of bolts or the like. Freely rotatable in the extension 66 is an idler sprocket wheel 118 mounted on a stub shaft 120 and alined with the drive sprocket to enable an endless loop 116 of digger chain to be trained about the ends of the beam. Obviously, relative lengthening of the beam 64 and extension 66 for the purpose of taking up slack in the chain 116 may be effected by alinement of appropriate apertures.

Means are provided for the purpose of rotating the said sleeve 34 and thereby adjusting the angle of the beam 64. This means consists of an arrangement of belt-driven or chain-driven sprocket wheels, shafts, and other associated linkages. A sprocket wheel 68 (Figure 16) is secured to the said sleeve 34 and a chain 70 extends therearound and around a second suitable sprocket wheel 72 which is journaled on a countershaft 74. The shaft 74 is, in turn, journaled in bearings 76 and 78 which are suitably secured to the said frame 12. Another sprocket wheel 80 is provided on the shaft 74 and a sprocket wheel 82 is engageable therewith through the medium of a chain 83. The sprocket wheel 82 is rigidly secured to a shaft 84 which is suitably journaled in the frame 12 in bearings 86 and 88. A hand wheel 90 or a suitable equivalent is mounted at one end of the said shaft 84 for the purpose of rotating the sprocket wheel 82 which, in turn, rotates the sleeve 34 through the medium of the above-described gear and chain arrangement. It will be seen that upon rotation of the sleeve 34, the brackets 62, 60 are rotated, lifting the beam 64 connected thereto. Consequently, the depth of the trench to be dug may be regulated and the beam 64 may for transport be fully raised to the inoperative position.

In order to discharge loose dirt outwardly from the centerline of the vehicle ahead of the beam 64 and for preliminary leveling of the earth, a horizontal auger 100 is provided having a shaft 98 and oppositely directed flights 102, 104 thereon. The shaft 98 is supported at each of its ends by swinging drop links 96, 107, respectively, the drop link 96 having adjacent thereto a housing 106 provided with a detachable cover 105. It is noted at this point that the drop links 96 and 107 are extensible, thereby enabling the level of the auger 100 to be initially adjusted. For establishing a driving connection between the shafts 28, 98 they are provided with sprocket wheels 110, 108 respectively which lie within the housing 106, and which are in mesh with a sprocket chain 112. Since the auger 100 is driven from the shaft 28 it will be apparent that its speed is synchronized relative to the turning movement of the digger chain. The cover 105 is detachably received on the said housing 106 for the obvious purpose of providing access, and conventional wing nut and bolt construction 114 is utilized for securing purposes.

Figure 3:
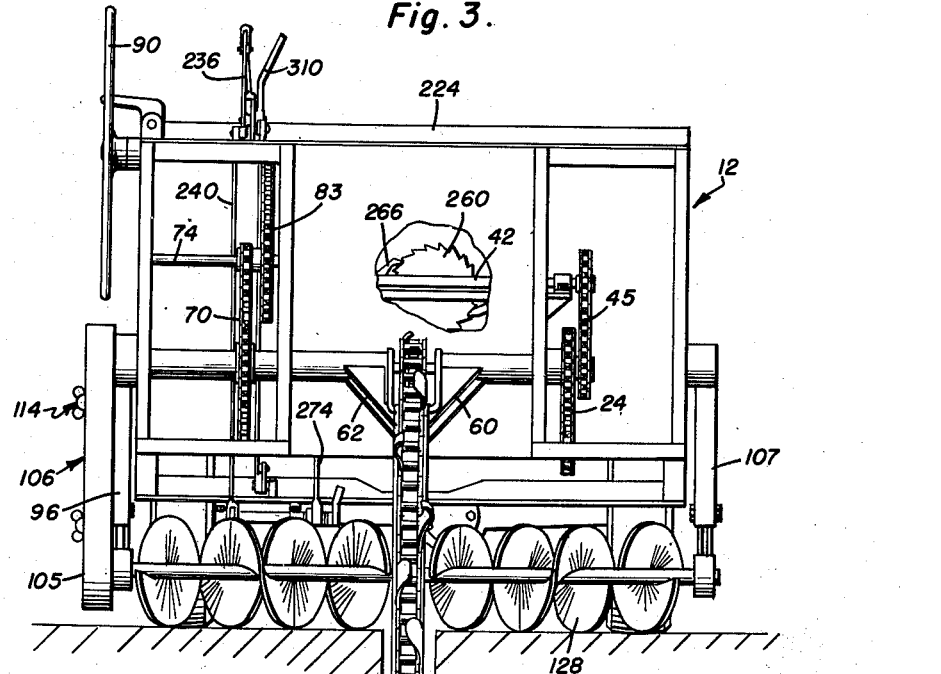
Figure 3 is an elevational rear view of the invention disclosed in Figure 1 with portions broken away to show details of construction.

In accordance with one aspect of the invention the chain 116 is provided with alternately right and left hand cutter blades arranged to extend both radially and laterally outward from the loop of chain 116 as shown in Figures 3, 7 and 8. In the present embodiment each blade 122 consists of a metal plate fastened to the side wall of the chain and curved inwardly toward the axis of the chain. Each blade has a sharply tapered or sharpened leading edge 126 and a trailing edge 124. As will be observed in Figure 7, the blades are formed so that each leading edge 126 is sharpened in its region of greatest lateral extent to cut a trench having a clean and smooth wall. Various cross sections are shown in Figures 11 through 15 for the purpose of showing this construction. In operation the blades are moved edgewise, the leading edges being brought into cutting or scraping contact with the earth as a result of longitudinal movement of the chain and broadwise movement of the beam. It will be noted that the leading edges 126 and the trailing edges 124 are only slightly offset with respect to one another and the surface between them is smooth and free of pockets or other bucket-like receptacles for catching the earth loosened by the leading edge. Thus the loosened earth cannot be entrapped or pocketed in the blade. A further feature of the cutter blade arrangement is well brought out in Figure 4 where it will be noted that the successive right and left hand cutter blades have a different width or lateral span relative to the chain. Thus one pair of cutter blades designated at 123 has an overall lateral width which is substantially equal to that of the chain with the free or leading edges thereof reaching substantially to the center of the chain and even overlapping slightly. It will be apparent that these blades acting alone would be capable of producing a channel in the earth which is sufficiently wide for the admission of the chain. These may for purposes of convenience be termed center cutters. A successive pair of right and left hand cutter blades designated at 125, although of the same general shape, have a greater width or span and these will, of course, tend to broaden the channel being cut by the blades of lesser span. Since the blades project from the chain 116 by differing amounts, the action on the earth is obviously quite analogous to that of broaching in machine tool practice. In operation, refuse and other products of digging are lifted as well as cut. In fact, they are lifted from the trench and raised to an auger 128, to be described later. Extensions 130 are provided on each of the cutter blades having a mounting surface with suitable apertures 132 formed therein. It is through these apertures 132 that the conventional roller bearing pins 134 extend, with the blades mounted flatly on the side-wall of the chain. Of course, the usual plates 136 may be supplied in conjunction with the cutter blades at this point for additional strength. It is noted that the said plates may be supplied on either side of the cutting blades in accordance with the prerogative of the manufacturer and in accordance with the dictates of good design and sound engineering principles.

Figure 10:
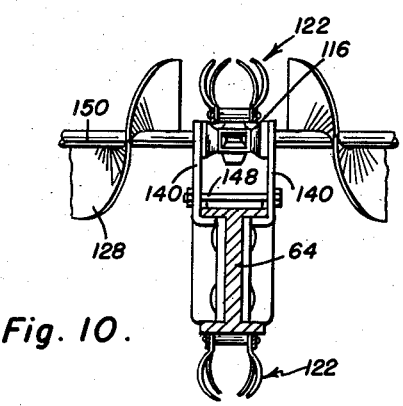
Figure 10 is a sectional view illustrating a detail of construction and taken substantially on the line 10—10 of Figure 1 and in the direction of the arrows.

One might well wonder how the cutter blades, being arranged in non-opposing relation on a chain free of scoops, buckets and the like, can be effective to elevate the loosened earth. Although a large proportion of the loosened earth must obviously fall free of the cutter blades, it must eventually reach the surface for the device to operate. The fact that it does with substantially no delay can only be explained by the repeated urging or impact imparted to the earth by the successive blades and the drag of the chain itself. The fact that the channel cut by the blades is considerably inclined undoubtedly aids this process. A further clue to the successful operation appears in Figure 10 where it will be noted that the upwardly projected area of the blades of unlike width is much greater than that which would obtain if all the blades were in perfect alinement along the chain.

It will be apparent that with no pockets in the blades to fill up with the loosened earth, the jamming and clogging associated with bucket type cutters, particularly under wet and clayey conditions, cannot occur. Further, in conventional buckets the earth must be carried to the top of the loop of chain before the bucket is inverted and the earth allowed to spill out. Here, in the absence of buckets, the earth must be freed at the point of exit, in other words, at or only slightly above the surface of the earth in position to be immediately removed by the auger.

As mentioned above and lightly touched upon, there is provided a winch assembly at the forward end of the vehicle 10. A pair of brackets 160 and 162, respectively, are secured to the said forward end of the vehicle 10 (Figure 2) and a boom, composed of arms 164 and 168, respectively, is pivoted thereto. A shaft 166 extends through the said brackets 160 and 162 and also extends through the terminal extensions 170 and 172, which are secured to the said arms 164 and 168. This shaft 166 is provided with threaded terminal portions and suitable nuts 174 are received thereon. A pair of spacer collars 176 and 178, respectively, are received on the shaft 166, abutting the said extensions 170 and 172 as well as a drum 180 which is inserted therebetween. A ratchet wheel 182 is secured to one face of the said drum 180 or, if desired, may be formed integral therewith. A rocker arm 184 is pivoted on the said shaft 166 and is provided with apertures at both ends thereof. A pin 186 extends through the upper aperture in the said rocker 184 and a ratchet 188 is pivoted thereon. This ratchet engages the teeth of the ratchet wheel 182 for advancing the drum 180 as will be set forth later. The lower end of the rocker arm 184 has another pin 190 extending therethrough. Pivoted on the said pin 190 is the forward end portion 192 of a reciprocating rod 194. This rod extends to the rearmost portion of the said vehicle 10, whence it derives its force for transmission of power. An aperture is provided in one of the faces of the drum 180 for receiving the terminal portion of the cable 198 therein. The latter may be retained by the simple and obvious expedient of tying a knot in the end thereof. The cable is wound about the said drum 180 and extends through the guide means at the forward end of the boom. The preferable guide means consists of a pair of sheaves 200 and 202, respectively, which are suitably journaled on a bracket 204. To additionally guide the cable a roller 206 extends across suitable supports 208 and 210, respectively, which are formed as extensions of the arms 164 and 168.

During certain phases of operation, it is advisable and advantageous to lift the boom to a vertical position as shown and dotted in Figure 1. When doing this, means must be provided for retaining the said boom in this position. Accordingly, a pair of brackets 212 and 214 are supplied. The first has a plurality of apertures 216 therein which may be selectively engaged with the single aperture in the bracket 214, and a pin or other retaining means may be inserted therethrough for the purpose of retaining the said boom in the desired position.

Turning again to Figure 16, there is disclosed a speed-controlled device for regulating the speed of forward travel of the vehicle 10 relative to the sprocket chain 116. The mechanism to be described at this time is provided for the purpose of imparting a rotary motion to the cable drum 180 and for slowly rotating the drive shaft of the vehicle at a rate coordinated therewith. The free end of the said cable 198 is adapted to be secured to some suitable anchoring post either natural or supplied. The connecting rod 54, mentioned and described above, has a flattened portion at the lower end thereof which includes a slot 220.

Means will next be described for causing the connecting rod 54 to impart an adjustable amount of reciprocating movement to the rod 194 leading forward to the winch. The adjustment is effected at a control quadrant 222 secured to a member 224 mounted on the frame 12. A plurality of notches 226 are provided about the periphery of the control quadrant 222 for receiving a latch keeper 228 therein, the latter being biased by means of a conventional spring 230 to position a quadrant lever 236. The latter is pivoted by a suitable pivot pin 238 to the quadrant 222. The quadrant lever has an arm movable therewith which is pivoted to a stroke-adjusting rod 240. The lower end of the latter is secured to a crank 242. This crank is secured to a sleeve 243 (see Fig. 20) which is journaled in suitable bearings 245 and 246, respectively, which depend from a frame member 248. A bell-crank 250 is secured to a shaft 244 which is journaled within the sleeve 243. A bracket 252 is secured to the sleeve 243. This bracket 252 bears against a second bracket 254 which is rigidly secured to the bell-crank 250. It may be readily appreciated that by forward adjusting movement of the quadrant lever 236, the rod 240 is raised and, through the medium of the crank 242, the sleeve 243 is rotated, rotatively positioning the bracket 252 and defining a limit stop for the bracket 254, and hence the crank 250, in the "return" direction. The latter selectively enlarges or lessens the effective travel of the said rod 54. This is done by means of reducing or lengthening the stroke of the pin 256 mounted on the crank 250 and which is engaged in the slot 220.

As described above, the motion of the said link 254 is reciprocatory due to the movement of the crank 52. To transmit the reciprocating movement forwardly, the rod 194 is provided with a clevis which engages the lower portion of the bell-crank 250. Thus, as the connecting rod 54 reciprocates, the bell-crank 250 oscillates about its center as a pivot, thrusting the rod 194 back and forth through a predetermined distance. Since this rod 194 is secured to the lower portion of the rocker arm 184, the rocker arm will also undergo oscillating movement. As the rocker arm 184 is thrust forward, the keeper 188 engages a tooth of the wheel 182 and winds the drum 180 through a small though definite arc. This, in turn, plays in the cable 198, thereby stepping the vehicle 10 forward a definite, selected amount. Since power for driving the digger is derived from the same source that causes the rod 194 to reciprocate, the cutter and digging means will obviously be actuated at a selected speed coordinated with the forward movement of the vehicle.

For selective use with the winch drive, or if desired, additive use therewith, a second means for driving the vehicle 10 forward is provided. Often it is found desirable to utilize the wheels of the vehicle as traction wheels. This is true in instances wherein no permanent anchor is accessible and when the operator of the vehicle finds it impractical or unnecessary to construct one. As will presently be made clear, this last-mentioned driving means is also synchronous with the digging means and is actuated from the same control and power transmission means detailed above.

In Figure 16 there is shown a ratchet wheel 260 which is journaled in the front of the main frame 12 by a stub shaft 262. Also positioned on this stub shaft 262 is a ratchet arm 264 having one end pivoted to a ratchet 266. The other end of the arm 264 is resiliently secured to a suitable support member 268 by means of a spring 270 so that the arm tends to turn counterclockwise. A dog or keeper 272 is pivoted to the support member 268 to prevent retrograde rotation of the ratchet wheel 260.

For actuating the ratchet 266 the same is connected to a reciprocating rod 274 pivoted to a bell-crank 276 which is mounted on the shaft 244. Crank 276 thus oscillates as a unit with crank 250 previously referred to. It can now be appreciated that the ratchet wheel 260 may be rotatively advanced in the same manner as the ratchet wheel 182 and that the speed control lever 236 functions to regulate the rate of speed of both of them.

To utilize the rotation of the ratchet wheel 260, a sprocket wheel (unnumbered) is connected thereto and in mesh with a sprocket chain 280. A second sprocket wheel 282 is also in mesh with the chain 280, a shaft 284 being driven by said last-mentioned sprocket wheel. Referring to Figure 17, it is seen that the shaft 284 has an extension shaft 285 associated therewith and a universal joint 286 interposed therebetween. Together the shafts 284, 285 constitute what may be termed an auxiliary drive shaft. A second universal joint 288 connects with a pinion or swing gear 290 which is pivoted on a rocker 292. An actuating rod 294 extends from said rocker for the purpose of positioning the swing gear 290 in engagement with a ring gear 296 which is, in turn, mounted on a drum 297 drivingly connected with the main drive shafts 293, 295 associated with the rear and front wheel drive of the vehicle 10. The rod 294 has an adjustable lock nut 298 adjacent its outer end for the purpose of regulating the effective length thereof. A conventional handle 300 may be fixed to the rod 294 for swinging the gear 290 into and out of mesh with the drive shaft ring gear 296.

A clutch actuating lever 310 is pivoted to the quadrant 222, and an extension 312 continues to the usual conventional clutch actuating arm. This clutch (unshown) is of a well known type and serves the usual function of disconnecting the load from the engine.

Turning now to Figure 19, it will be noted that a rod 302 is pivoted to a suitable bracket 304. A clamp 307 is provided on the rod for engaging the steering wheel 308, thereby retaining the wheel 308 in a selected locked position in the operation of digging trenches.

While the operation will be apparent from the foregoing, it may be helpful to summarize it very briefly. The vehicle is driven in the usual manner to the "set" and shifted into neutral so that power is disconnected from the wheel drive shafts. The beam 64 is then lowered by means of the handwheel 90 until it rests on the ground. The belt pulley drive is next connected to the engine which starts the cutter chain rotating and the cutter blades mounted thereon to dig into the earth. By additional rotation of the handwheel 90, the beam 64 is gradually swung down into the position which it occupies in Figure 1. In order to make the vehicle move slowly forward, the quadrant lever 236 (Figure 16) is advanced to a position which causes the cranks 250, 276 to oscillate back and forth through a desired angle, whereupon reciprocating movement is imparted simultaneously to the rod 194 which leads forwardly to the winch ratchet wheel 182 as well as the rod 274 which extends vertically for driving the drive shaft ratchet wheel 260. The latter causes a slow and intermittent rotation of the auxiliary drive shaft 284, 285 connected thereto, producing (via the ring gear on the main drive shafts 293, 295) slow and intermittent advancement of the vehicle. This means that the broadwise movement of the beam 64 carrying the cutters is, in the present embodiment, intermittent or pulsating, giving the cutters time to clear themselves at regular intervals. With a cable anchored forwardly of the vehicle to a tree or the like, additional forward driving force is obtained which occurs in steps synchronized with the force applied to the vehicle wheels.

With regard to the action of the augers, the auger 100 acts preliminarily to remove any surface irregularities and to discharge on each side of the trencher a portion of the loose earth elevated to the surface by the cutter blades. The auger 128, with is oppositely directed flights rotating in unison with the chain, discharges the remaining dirt to complete a pair of well defined ridges and sweeps a clear path on each side of the trench. After the installation of cable or the like has been completed, a single pass with a conventional scraper on each side of the trench is sufficient to replace the earth which has been removed. It will be apparent that the fill may be watered down between passes if desired to meet contractual requirements.

While there has been described and illustrated but a single preferred embodiment of the present invention, capable of performing all of the specifically mentioned objects as well as numerous ancillary objects, it is apparent to those skilled in the art that various changes, including omissions, additions and re-arrangement of elements may be made herein without departing from the spirit of the invention. Accordingly, limitation is sought only in accordance with the scope of the following claims. The term "tractor" in the following claims shall be taken to mean an automotive vehicle such as the Jeep or conventional tractor having substantial traction and capable of totally supporting and transporting a trencher of the type herein disclosed.

I claim as my invention:

1. A trencher attachment for a tractor having a power take-off at the rear end thereof and having rear driving wheels for normally propelling the same together with means for disconnecting such wheels from the tractor engine, comprising, in combination, a supporting frame, detachable means for rigidly connecting the supporting frame to the rear end of the tractor so that the frame is totally carried thereby in a position substantially elevated above the earth, a beam having its forward end pivoted in said frame for swinging movement between a digging position in which the beam extends rearwardly and downwardly from the frame and an elevated transport position in which the beam is swung upwardly with respect to said frame for transport, means including a loop of cutter chain trained about said beam and arranged for driving by said power take-off when the beam is in digging position for cutting a trench upon forward advancement of said tractor, an auxiliary step-down drive connection having its input coupled to said power take-off and having its output coupled to said tractor driving wheels, and means for completing said auxiliary drive connection when the wheels are disconnected from the normal drive from the engine to effect driving through said tractor wheels from said power take-off at a speed which is sufficiently slow as to correspond to the speed of said cutter chain.

2. A trencher for attachment to a tractor having a power take-off for supplying power at the rear end thereof and having a drive shaft for supplying power to the rear wheels, said trencher comprising, in combination, a frame adapted to be detachably secured to the rear end of said tractor, an endless trench cutter having a shaft journaled in said frame on an axis running transversely thereof and having a step-down drive connection adapted for connection to said power take-off, means for lowering the trench cutter downwardly into the surface of the earth so that it channels a trench upon forward advancement of said tractor, a crank mechanism driven by said power take-off, a forward ratchet mechanism arranged for mounting on the forward end of the tractor and a rear ratchet mechanism mounted in said frame at the rear end of the tractor, means including reciprocable ratchet rods driven from said crank mechanism for producing simultaneous advancement of said ratchet mechanisms respectively, a winch driven by said forward ratchet mechanism and having a cable for connection to a stationary object for drawing said tractor forwardly, and a drive connection from said rear ratchet mechanism for supplying power to said tractor drive shaft.

3. A trencher for attachment to a tractor having a power take-off for supplying power to the rear end thereof and having a drive shaft for supplying power to the rear wheels of the tractor, said trencher comprising, in combination, a frame adapted to be detachably secured to the rear end of said tractor, an endless trench cutter having a shaft journaled in said frame on an axis running transversely thereof and having a drive connection adapted for coupling to said power take-off, means for lowering the trench cutter downwardly into the surface of the earth so that it channels a trench upon forward advancement of said tractor, a winch including a cable for connection to a stationary object for drawing the tractor forwardly, and means including a step-down drive connection for rotating both said winch and said drive shaft at such respective speeds as to cause them to be simultaneously effective in producing forward movement of the tractor.

4. A trencher for attachment to a tractor having a power take-off at the rear end thereof, said trencher comprising, in combination, a frame adapted to be detachably secured to the rear end of said tractor and totally supported thereby, a chain type trench cutter having a sprocket drive shaft engaging the same and journaled in said frame on an axis running transversely of the tractor, a step-down drive connection adapted for connecting said drive shaft to said power take-off, means for lowering the trench cutter about said shaft so that it extends rearwardly and downwardly into the surface of the earth for channeling a trench upon forward advancement of said tractor, a crank driven by said power take-off, a ratchet mechanism arranged for mounting on the forward end of the tractor including a reciprocable rod driven from said crank mechanism and extending forwardly along the underside of the tractor for producing advancement of said ratchet mechanism, and a winch connected to said ratchet mechanism and having a cable for anchoring to a stationary object for drawing said tractor intermittently forward in step with the speed of the trench cutter.

FRIEDRICH J. SCHMIDT.

REFERENCES CITED

The following references are of record in the file of this patent:

UNITED STATES PATENTS

| Number | Name | Date |
|---|---|---|
| 2,502 | Chaffee et al. | Oct. 15, 1861 |
| 351,930 | McAnlis | Nov. 2, 1886 |
| 516,355 | Mason | Mar. 13, 1894 |
| 646,674 | Bentson | Apr. 3, 1900 |
| 946,609 | Loomis | Jan. 18, 1910 |
| 1,521,236 | Franks | Dec. 30, 1924 |
| 1,802,106 | Bosworth | Apr. 21, 1931 |
| 1,892,521 | Vaughn et al. | Dec. 27, 1932 |
| 1,978,733 | Yocum | Oct. 30, 1934 |
| 2,252,837 | Dicke | Aug. 19, 1941 |
| 2,311,834 | Hollmann et al. | Feb. 23, 1943 |